J. W. VAN METER.
METHOD OF PRODUCING POISONOUS GASES.
APPLICATION FILED JUNE 15, 1920.
1,399,829.
Patented Dec. 13, 1921.
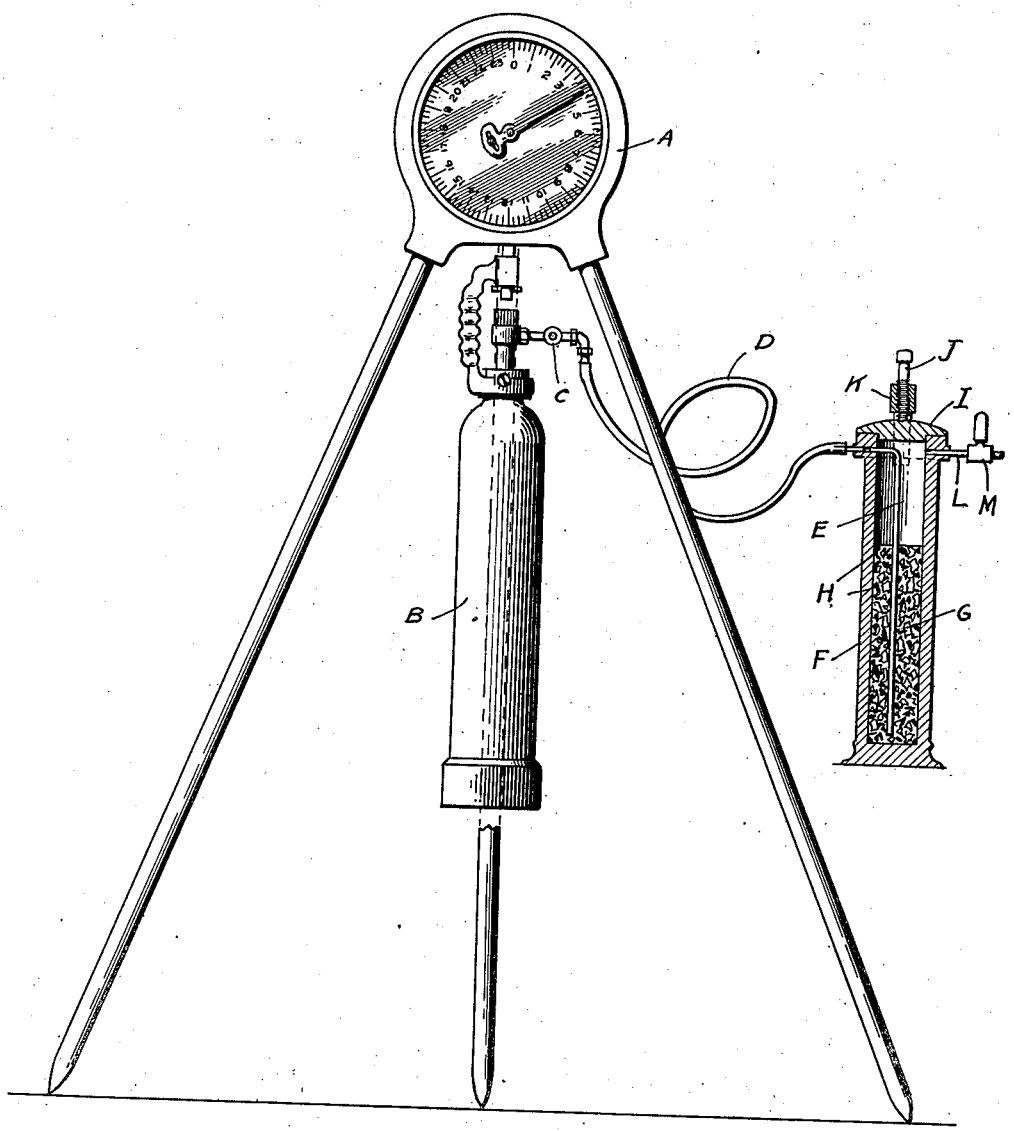
INVENTOR.
JAMES W. VAN METER
BY *Bradley L. Benson*
ATTORNEY

UNITED STATES PATENT OFFICE.

JAMES W. VAN METER, OF SAN FRANCISCO, CALIFORNIA.

METHOD OF PRODUCING POISONOUS GASES.

1,399,829.   Specification of Letters Patent.   Patented Dec. 13, 1921.

Application filed June 15, 1920. Serial No. 389,509.

*To all whom it may concern:*

Be it known that I, JAMES W. VAN METER, a citizen of the United States of America, residing at San Francisco, in the county of San Francisco and State of California, have invented certain new and useful Improvements in Methods of Producing Poisonous Gases, of which the following is a specification.

My invention relates to an improvement in poisonous gases and the process of manufacturing same. Chlorin, cyanogen, and arsenical gases have all been used separately with more or less success as fumigating agents, germicides, disinfectants, deodorizers and for the extermination of insects and animals. My improvement consists in a new combination or mixture of the above named gases and a novel method of producing same without intricate apparatus.

My process consists of generating or liberating cyanogen from sodium or potassium salts by means of chlorin gas in combination with different metallic elements. The resulting combination of gases are products of the operation, being a combination or mixture of cyanogen, chlorin and whatever gas is liberated from the metallic element used.

The said combination of gases possesses certain advantageous properties for commercial uses that are not found in any of the gases used separately, as will be later explained.

Cyanogen and arsenical gases as used at present necessitate the use of expensive spraying devices, retorts, pumps, blowers, and the like, which require skill and judgment in operation and a resultant waste of the chemical ingredients.

The unused or wasted chemicals being of a highly poisonous nature, are a menace to life.

My discovery makes it possible to make and use the above gases in combination with a minimum cost of production and with comparative safety for unskilled labor.

Chlorin is an active chemical agent and combines readily with many metallic substances. Finely divided arsenic, antimony, copper, tin and lead, burn in the presence of chlorin gas.

Chlorin is heavier than air and descends into the smallest cracks and crevices, forcing air therefrom, and is an active germicide, on account of its affinity for hydrogen and the consequent release of nascent oxygen when it comes in contact with micro-organisms in a moist state.

In my process I pass chlorin gas under pressure over a suitable cyanid salt, such as sodium cyanid. Cyanogen will be liberated and combines or mixes with the chlorin in transit. However, I have found that if the sodium cyanid is mixed with a suitable metallic substance upon which the chlorin will act, the heat generated by the action of the chlorin on the said metallic substance in the presence of sodium cyanid liberates cyanogen more rapidly.

In carrying out my process, I pass a stream of chlorin gas preferably in a moist state through a mixture of sodium cyanid and metallic substance contained in a closed vessel. The heat thrown off from the burning substance caused by the chemical action of the chlorin liberates cyanogen from sodium cyanid forming a combination or mixture of chlorin, cyanogen and other gases. It will be seen that I use the same chlorin gas for three distinct purposes at the same time, first—I utilize the heat created by the action of the chlorin on a metal such as iron, in fine particles, second as a germicidal agent in combination with resultant gases, and third, as a carrying agent using the specific gravity of chlorin gas as a regulating factor in determining the specific gravity of the resulting combination.

For example, I vary the nature of the gas produced by varying the ingredients.

If I substitute iron for other metal and use only a sufficient amount of chlorin to liberate the cyanogen, I make a gas lighter than air of a cyanogen base, the chlorin being consumed in combining with the iron. The resulting gas is well adapted for orchard fumigation.

If I increase the amount of chlorin in conjunction with either sodium cyanid or metallic substance, I create a gas heavier than air, and by reason of its gravity is specially adapted for the destruction of underground insects and animals.

I have used with good results chlorin gas generated by the action of hydrochloric acid on sodium chlorid in the presence of binoxid of maganese. I have had favorable results in using liquid chlorin as the pressure and quantity can be more easily regulated.

In the accompanying one sheet of drawings I show diagramatically an apparatus by which it is possible to carry out my process.

I do not claim the apparatus in this specification, as the same is covered by my copending application for Letters Patent of the United States on portable apparatus for generating poisonous gases, filed August 31, 1920, Serial No. 407,073.

In the drawing, A indicates a scale supported on a tripod and adapted to removably support a chlorin container B.

The chlorin container is provided with suitable valves C to control the passage of chlorin through a flexible conduit D which terminates in a pipe E extending into and nearly to the bottom of a container F, which is partially filled with sodium cyanid G intermixed with metallic particles H. The container F is closed by a cap I secured by a screw J extending through a yoke K, and has an outlet pipe L controlled by a pressure valve M.

In operation a chlorin container B is placed on the scale A, and connected to the conduit D. A container F is also connected to said conduit loaded with the ingredients heretofore described to produce the desired gas.

Obviously the weight of the gases produced will be determined by the operations of the valves controlling the conduits.

Cyanogen gas is a deadly poison to aphis and larva affecting citrus and other orchard trees. At the same time it is not injurious to the foliage or physical life of the tree while chlorin on the contrary, while it destroys all insect life is injurious to the physical life of the tree.

By my improved process, it is possible to utilize the beneficial qualities of both of these gases for the same purpose, and eliminate the obnoxious properties of both, which has heretofore prevented their use separately for this purpose.

For instance, in fumigating an affected tree, the tree is covered or inclosed by a gas proof tent or cover, and my improved mixture or combination of chlorin and cyanogen is admitted at the base of the tent.

The cyanogen being the lighter, rises rapidly to the top of the tent, coming in contact while in transit with all parts of the tree, destroying insect life and larva.

The chlorin gas being heavier remains at the base killing all insects that may fall from the tree during the operation, and at the same time destroying all grass, weeds and vegetation surrounding the base of the tree which is detrimental to the tree.

It will be seen that this is a condition or distinct advantage peculiar to my process.

Another advantage of my process lies in the fact that it is not necessary to prepare any poisonous ingredient on the premises, thereby eliminating danger to life, and saving labor and expense.

In the use of my process the chlorin and cyanid mixture can be furnished to the user in separate sealed steel cylinders, there being no necessity for opening the cylinders for use until exhausted when they may be returned to the manufacturer for a fresh charge. This obviates the danger to live stock which might arise from waste or residue chemicals of a poisonous nature, which has heretofore been a great source of annoyance and expense.

Having thus described my invention, what I claim as new and wish to secure by Letters Patent of the United States is:

1. The method of producing a combination or mixture of gases which consists in liberating cyanogen from its salts by the reaction of chlorin on said salts.

2. The method of producing a combination or mixture of gases which consists in liberating cyanogen from its salts by the reaction of chlorin under pressure on said salts.

3. The method of producing a combination or mixture of gases which consists in liberating cyanogen from its salts by the reaction of chlorin on said salts in the presence of a metallic element.

4. The method of producing an insecticidal gas which consists in causing chlorin to act on an alkaline cyanid whereby the heat generated by such action causes cyanogen to be evolved.

5. The method of producing a mixture of insecticidal gases which consists in causing an excess of chlorin to act on an alkaline cyanid whereby the heat generated by such action causes cyanogen to be evolved and mix with said excess of chlorin.

In testimony whereof I affix my signature.

JAMES W. VAN METER.